US012563441B2

(12) United States Patent
Sung

(10) Patent No.: US 12,563,441 B2
(45) Date of Patent: Feb. 24, 2026

(54) SYSTEM AND METHOD FOR MANAGING USER EQUIPMENT IN A 5G MASSIVE MIMO NETWORK

(71) Applicant: T-Mobile Innovations LLC, Overland Park, KS (US)

(72) Inventor: Sanghoon Sung, Ashburn, VA (US)

(73) Assignee: T-Mobile Innovations LLC, Overland Park, KS (US)

( * ) Notice: Subject to any disclaimer, the term of this patent is extended or adjusted under 35 U.S.C. 154(b) by 331 days.

(21) Appl. No.: 18/487,461

(22) Filed: Oct. 16, 2023

(65) Prior Publication Data

US 2025/0126510 A1      Apr. 17, 2025

(51) Int. Cl.
*H04W 28/02*       (2009.01)
*H04B 7/0452*       (2017.01)

(52) U.S. Cl.
CPC ...... *H04W 28/0268* (2013.01); *H04B 7/0452* (2013.01); *H04W 28/0236* (2013.01)

(58) Field of Classification Search
CPC .......... H04W 28/0268; H04W 28/0236; H04B 7/0452
See application file for complete search history.

(56) References Cited

U.S. PATENT DOCUMENTS

| | | | | |
|---|---|---|---|---|
| 10,333,664 | B1 * | 6/2019 | Pawar ................... | H04L 5/0037 |
| 11,902,188 | B1 * | 2/2024 | Kowdley ............. | H04B 17/336 |
| 2015/0127823 | A1 | 5/2015 | Moeller et al. | |
| 2016/0294453 | A1 | 10/2016 | Truong et al. | |
| 2017/0208129 | A1 | 7/2017 | Maguire et al. | |
| 2017/0222710 | A1 * | 8/2017 | Eitan .................... | H04B 7/0452 |
| 2020/0162837 | A1 * | 5/2020 | Marupaduga ......... | H04W 4/021 |
| 2021/0184745 | A1 | 6/2021 | Meyer | |
| 2022/0264461 | A1 * | 8/2022 | Chen .................... | H04W 72/23 |
| 2022/0353650 | A1 | 11/2022 | Aldana et al. | |
| 2023/0098863 | A1 * | 3/2023 | Jalloul .................. | H04L 5/0051 |
| | | | | 370/329 |
| 2023/0362968 | A1 | 11/2023 | Xi et al. | |
| 2025/0126510 | A1 * | 4/2025 | Sung ................ | H04W 28/0236 |

OTHER PUBLICATIONS

Jan. 16, 2025 PCT/US2024/051529, Written Opinion of the International Searching Authority and International Search Report in copending application.

* cited by examiner

*Primary Examiner* — Parth Patel
(74) *Attorney, Agent, or Firm* — Jones Burke, PLLC

(57) ABSTRACT

Systems and methods are provided for managing wireless devices, specifically for managing transitions between SU-MIMO pairing and MU-MIMO pairing based on group membership and signal quality. Methods include monitoring a signal quality between an access node and one or more wireless devices, determining that a signal quality metric is below a threshold, and determining that the one or more wireless devices belongs to one or more groups based at least in part on a required Quality of Service (QoS) of the one or more wireless devices. The methods further include transitioning the one or more wireless devices from SU-MIMO pairing to MU-MIMO pairing based on the determining that the one or more wireless devices belongs to the one or more groups and the determining that the signal quality metric is below the threshold.

20 Claims, 5 Drawing Sheets

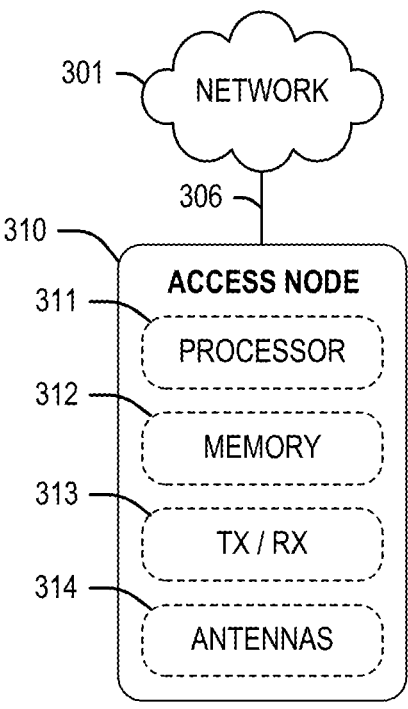
<u>FIG. 3</u>

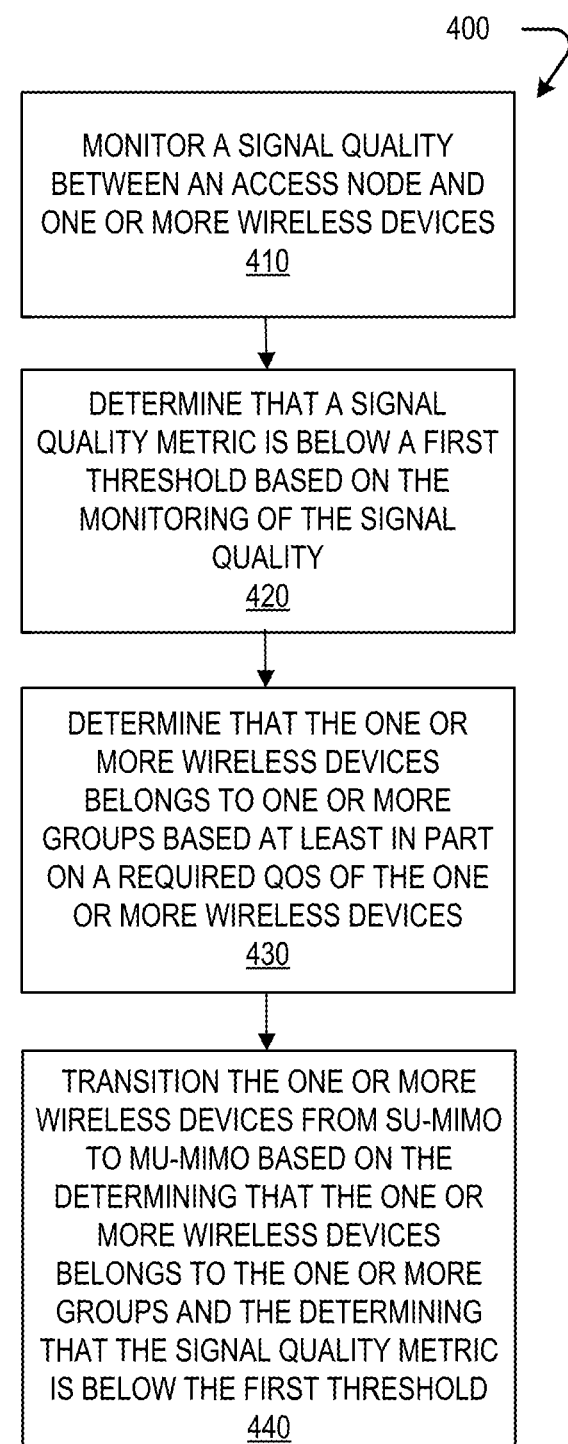

400

MONITOR A SIGNAL QUALITY
BETWEEN AN ACCESS NODE AND
ONE OR MORE WIRELESS DEVICES
410

DETERMINE THAT A SIGNAL
QUALITY METRIC IS BELOW A FIRST
THRESHOLD BASED ON THE
MONITORING OF THE SIGNAL
QUALITY
420

DETERMINE THAT THE ONE OR
MORE WIRELESS DEVICES
BELONGS TO ONE OR MORE
GROUPS BASED AT LEAST IN PART
ON A REQUIRED QOS OF THE ONE
OR MORE WIRELESS DEVICES
430

TRANSITION THE ONE OR MORE
WIRELESS DEVICES FROM SU-MIMO
TO MU-MIMO BASED ON THE
DETERMINING THAT THE ONE OR
MORE WIRELESS DEVICES
BELONGS TO THE ONE OR MORE
GROUPS AND THE DETERMINING
THAT THE SIGNAL QUALITY METRIC
IS BELOW THE FIRST THRESHOLD
440

FIG. 4

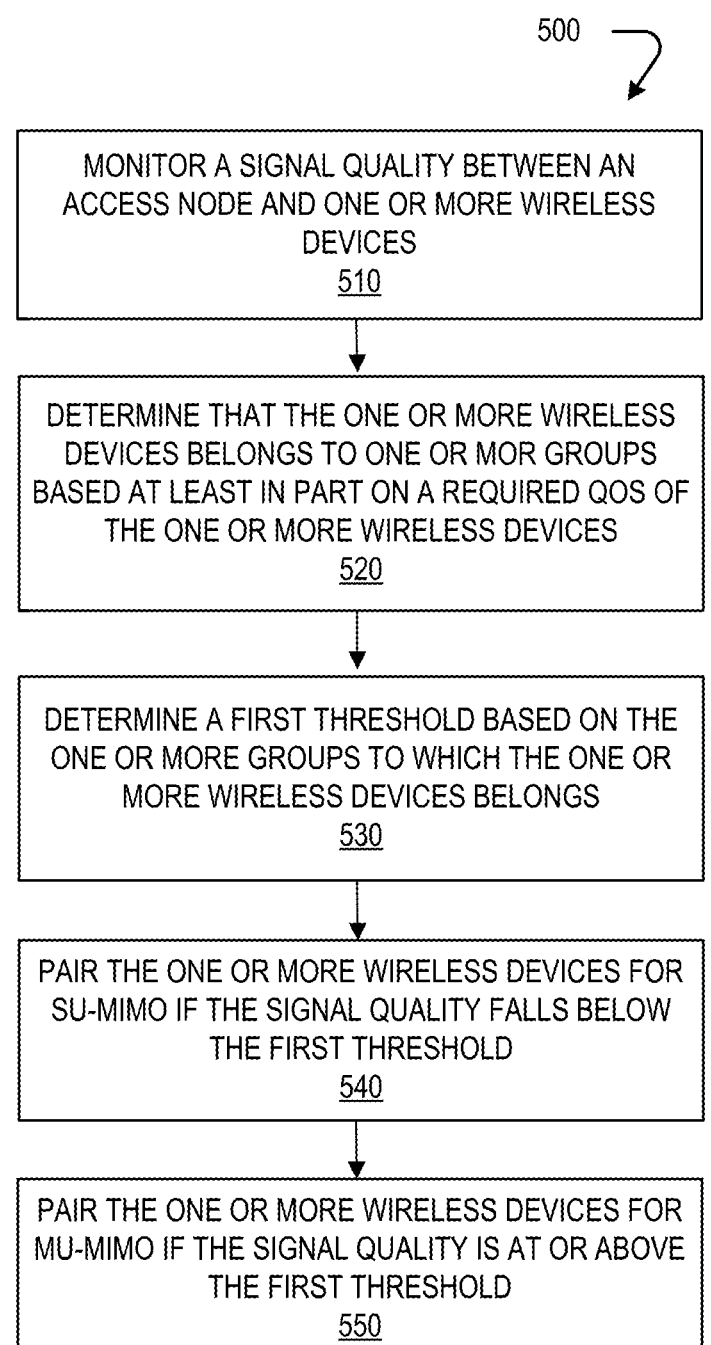

500

MONITOR A SIGNAL QUALITY BETWEEN AN ACCESS NODE AND ONE OR MORE WIRELESS DEVICES
510

DETERMINE THAT THE ONE OR MORE WIRELESS DEVICES BELONGS TO ONE OR MOR GROUPS BASED AT LEAST IN PART ON A REQUIRED QOS OF THE ONE OR MORE WIRELESS DEVICES
520

DETERMINE A FIRST THRESHOLD BASED ON THE ONE OR MORE GROUPS TO WHICH THE ONE OR MORE WIRELESS DEVICES BELONGS
530

PAIR THE ONE OR MORE WIRELESS DEVICES FOR SU-MIMO IF THE SIGNAL QUALITY FALLS BELOW THE FIRST THRESHOLD
540

PAIR THE ONE OR MORE WIRELESS DEVICES FOR MU-MIMO IF THE SIGNAL QUALITY IS AT OR ABOVE THE FIRST THRESHOLD
550

FIG. 5

SYSTEM AND METHOD FOR MANAGING USER EQUIPMENT IN A 5G MASSIVE MIMO NETWORK

TECHNICAL BACKGROUND

As wireless networks evolve and grow, there are ongoing challenges in communicating data across different types of networks. For example, a wireless network may include one or more access nodes, such as base stations, for providing wireless voice and data service to wireless devices in various coverage areas of the one or more access nodes. Wireless networks may be configured to utilize a single-user multiple-in multiple-out (SU-MIMO) operating mode and/or a multi-user (MU-MIMO) mode. In the SU-MIMO operating mode, multiple data streams are directed towards individual wireless devices. In the MU-MIMO operating mode, the multiple data streams can be directed towards plural wireless devices that are selected to participate in the MU-MIMO operating mode based on the orthogonality of transmission, thereby maximizing resources. MIMO has been identified as one of the promising air interface technologies to address the capacity requirement demanded by 5G networks. A device participating in MU-MIMO will likely see different network performance characteristics than one participating in SU-MIMO. A provider of wireless services may want better control over how wireless devices participate in SU-MIMO or MU-MIMO in order to better manage their wireless network.

OVERVIEW

Examples described herein include methods and systems for managing wireless devices, specifically for managing transitions between SU-MIMO pairing and MU-MIMO pairing based on group membership and signal quality. An exemplary method includes monitoring a signal quality between an access node and one or more wireless devices. The method further includes determining that a signal quality metric is below a threshold based on the monitoring of the signal quality between the access node and the one or more wireless devices. The method further includes determining that the one or more wireless devices belongs to one or more groups based at least in part on a required Quality of Service (QoS) of the one or more wireless devices. The method further includes transitioning the one or more wireless devices from SU-MIMO pairing to MU-MIMO pairing based on the determining that the one or more wireless devices belongs to the one or more groups and the determining that the signal quality metric is below the threshold.

Another exemplary embodiment includes a system configured with an access node including at least one electronic processor configured to perform operations. The operations include monitoring a signal quality between the access node and one or more wireless devices. The operations further include determining that a signal quality metric is below a threshold based on the monitoring of the signal quality between the access node and the one or more wireless devices. The operations further include determining that the one or more wireless devices belongs to one or more groups based at least in part on a required Quality of Service (QoS) of the one or more wireless devices. The operations further include transitioning the one or more wireless devices from SU-MIMO pairing to MU-MIMO pairing based on the determining that the one or more wireless devices belongs to the one or more groups and the determining that the signal quality metric is below the threshold.

Another exemplary embodiment includes monitoring a signal quality between an access node and one or more wireless devices. The method further includes determining that the one or more wireless devices belongs to one or more groups based at least in part on a required Quality of Service (QoS) of the one or more wireless devices. The method further includes determining a first threshold based on the one or more groups to which the one or more wireless devices belongs. The method further includes pairing the one or more wireless devices for SU-MIMO if the signal quality falls below the first threshold. The method further includes pairing the one or more wireless devices for MU-MIMO if the signal quality is at or above the first threshold.

BRIEF DESCRIPTION OF THE DRAWINGS

These and other more detailed and specific features of various embodiments are more fully disclosed in the following description, reference being had to the accompanying drawings, in which:

FIG. 3 illustrates an exemplary access node in accordance with various aspects of the present disclosure;

FIG. 4 illustrates an exemplary process flow for managing user equipment in a 5G massive MU-MIMO wireless network;

FIG. 5 illustrates an exemplary process flow for managing user equipment in a 5G massive MU-MIMO wireless network.

DETAILED DESCRIPTION

Figure 1:
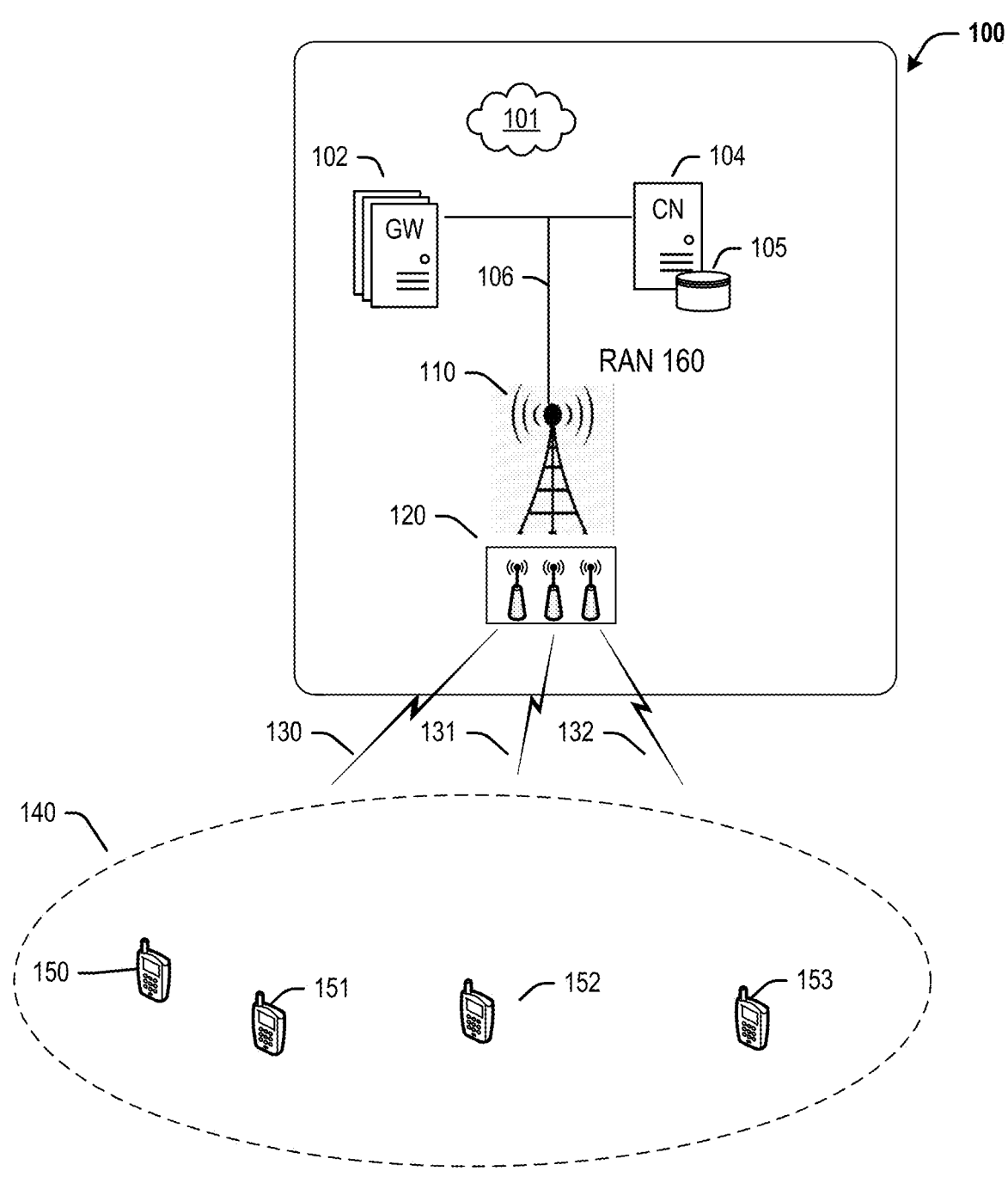
FIG. 1 illustrates an exemplary system for wireless communication in accordance with various aspects of the present disclosure.

In the following description, numerous details are set forth, such as flowcharts, schematics, and system configurations. It will be readily apparent to one skilled in the art that these specific details are merely exemplary and not intended to limit the scope of this application.

In accordance with various aspects of the present disclosure, a cellular or wireless network may be provided by an access node. The access node may utilize one or more antennas to communicate with wireless devices. As the number of simultaneous wireless devices with which an access node communicates increases, the bandwidth available to each wireless device tends to decrease. One method of improving bandwidth is to increase the number of antennas and implement multiple input multiple output (MIMO) transmission. 5G wireless networks have implemented both single user MIMO (SU-MIMO) and multiuser MIMO (MU-MIMO). Often the bandwidth available and communication performance of an individual device will be different while the device is paired for SU-MIMO versus MU-MIMO. When signal quality is good, it may be better for the wireless devices to operate in MU-MIMO mode. However, when signal quality is bad, it may be better for the wireless devices to operate in SU-MIMO mode.

Multi-user, multiple-input, multiple-output technology—better known as MU-MIMO (a.k.a. Next-Gen AC or AC Wave 2)—allows an access node to communicate with multiple devices simultaneously. This decreases the time each wireless device has to wait for a signal. An access node uses separate spatial streams to talk to multiple wireless devices concurrently.

5G massive MIMO systems can improve cell throughput by MU-MIMO technology that enables sharing the same channel resources among multiple users. This advanced technology requires almost complete spatial separation via beamforming among cochannel MU-MIMO signals in order to prevent excessive cochannel interference. In the current MU-MIMO scheduler, the determination of Modulation and Coding Scheme (MCS) level for MU-MIMO users is based on Channel State Information (CSI) feedback, such as Channel Quality Indicator (CQI), Rank Indicator (RI) or Precoding Matrix Indicator (PMI). In addition, the scheduler uses predicted SINR drop value to MU-MIMO cochannel interference to finalize MCS level allocation.

5G users may have single or multiple data bearers with different QoS requirements. However, due to inaccurate prediction of SINR drop value in deciding MCS level for MU-MIMO paired users, 5G users may experience difficulty for QoS fulfillment. In the described scheme, user grouping is used to aid in meeting QoS requirements during MIMO operation. The different conditions for becoming a MU-MIMO candidate user may be attached to respective user groups. Similarly, different conditions for being excluded from being a MU-MIMO candidate user may also be attached to respective groups. This scheme may provide a differentiated safety net of QoS for MU-MIMO users in the event of severe performance degradation.

Generally, a wireless device will see better throughput when the device is connected by way of SU-MIMO versus MU-MIMO. However, the wireless network will often provide enough bandwidth that a user might not even notice the difference. It is in the carrier's interest to service as many wireless devices using MU-MIMO as possible because it allows the carrier to service many more devices at the same time. However, if the channel conditions are not good enough to reliably support MU-MIMO, the device may be transitioned to SU-MIMO. Conversely, if the channel conditions are good enough to support MU-MIMO, the device is transitioned to MU-MIMO.

One way to manage these transitions is to define groups of devices and rules to manage the transitions based on the group memberships and signal quality. For example, a first group may contain a (wireless device currently being used for a voice call. The rules for the first group may be defined so that any wireless device that joins the group will start in SU-MIMO. The signal quality of the wireless device will be monitored and if it is above a certain threshold, then the wireless device may be safely moved to MU-MIMO without disturbing the call quality. At any point in time, the ongoing monitoring of signal quality could find that the signal quality has degraded to a point where call quality may be affected, and the wireless device can be moved back to SU-MIMO to avoid call quality degradation.

The group may be defined on any number of criteria, including grouping wireless devices that require the same level of Quality of Service (QoS) to provide a good user experience for whatever the user is doing on the wireless device. This may vary by the type of service being provided to the wireless device. Examples include voice, data, and video streaming. A video stream would have a higher QoS requirement than a voice call for example and could therefore benefit by having its wireless device move to SU-MIMO more quickly than a voice call as signal quality degrades. Another exemplary method of defining a group is by subscription level. For example, a user subscribing to a higher level of service from the carrier may be permitted to always stay in SU-MIMO where a user of a lower subscription tier may be moved to MU-MIMO when conditions permit.

The signal quality may be monitored by way of many different metrics including spectral efficiency, packet time delay, and packet error rate. With these signal quality metrics, a lower metric indicates a higher signal quality. These criteria are listed as merely examples and any relevant metric may be used alone or in combination. A transition from SU-MIMO to MU-MIMO may be triggered, for example, if the signal quality metric drops below a certain threshold indicating a higher signal quality. In another example, the transition from SU-MIMO to MU-MIMO may be triggered if the signal quality metric drops by a certain amount or percentage or drops by a certain amount or percentage over a certain time period. For example, even if the signal quality metric has not dropped low enough to reach the threshold, if it drops by at least a specific amount, 50% for example, the transition may be triggered. Likewise, the transition may be triggered if the signal quality metric drops by at least a specific rate, 50% over a period of 1 minute, for example. This specific amounts, rates and times may be set to any useaful amounts, rates or times and are not restricted by the examples given here. The transition from MU-MIMO to SU-MIMO may similarly be triggered if the signal quality metric reaches or exceeds a threshold, rises by a certain amount or percentage, or rises by a certain amount or percentage over a certain time period indicating a reduction in signal quality.

FIG. 1 depicts an exemplary system 100 for monitoring MU-MIMO paired wireless devices. System 100 includes a communication network 101, gateway node(s) 102, controller node 104, access node 110, and wireless devices 150-153. Access node 110 can be any network node configured to provide communication between wireless devices 150-153 and communication network 101, including standard access nodes and/or short range, low power, small access nodes.

For instance, access node 110 may include any standard access node, such as a macrocell access node, base transceiver station, a radio base station, an eNodeB device, an enhanced eNodeB device, a next generation or gigabit NodeB device (gNBs) in 5G networks, or the like. In other embodiments, access node 110 can be a small access node including a microcell access node, a picocell access node, a femtocell access node, or the like such as a home NodeB, home eNodeB or home gNodeB device. By virtue of comprising a plurality of antennae 120 as further described herein, access node 110 can deploy or implement different radio access technologies (RATs) such as 3G, 4G, 5G, sub-6G, mm-wave, as well as transmission modes including multiple-input-multiple-output (MIMO), single user MIMO (SU-MIMO), multi-user MIMO (MU-MIMO), etc. While three antennae are shown in the array 120, any number of antennae may be included in the array 120. Moreover, each of wireless devices 150-153 can also be equipped with a plurality of antennae enabling these different types of transmissions.

For example, each of wireless devices 150-153 may be capable of simultaneously communicating with access node 110 using combinations of antennae via 4G and 5G or any other RAT or transmission mode. For instance, MU-MIMO pairings and SU-MIMO pairings can be made by wireless devices 150-153. It is noted that any number of access nodes, antennae, MU-MIMO pools, and wireless devices can be implemented.

In operation, access node 110 (or any other entity within system 100) may be configured to execute a method including monitoring a signal quality between an access node and one or more wireless devices, determining that a signal quality metric is below a first threshold based on the monitoring of the signal quality between the access node and the one or more wireless devices, determining that the one or more devices belongs to one or more groups based at least in part on a required QoS of the one or more wireless devices, and transitioning the one or more wireless devices from SU-MIMO pairing to MU-MIMO pairing based on the determining that the one or more wireless devices belongs to the one or more groups and the determining that the signal quality metric is below the first threshold.

As discussed, the signal quality metric may include spectral efficiency, packet time delay, and packet error. With these signal quality metrics, a lower metric indicates a higher signal quality. The groups required QoS may be determined by the type of service being provided to the one or more wireless devices or by a subscription level of an owner of the one or more wireless devices.

The method may further include, determining that the signal quality metric rises to be at or above a second threshold, and transitioning the one or more wireless devices from MU-MIMO pairing to SU-MIMO pairing based on the determining that the one or more wireless devices belongs to the one or more groups and the determining that the signal quality metric has risen to be at or above the second threshold.

The method may further include, determining that a second signal quality metric is below a third threshold based on the monitoring of the signal quality between the access node and the one or more wireless devices, and transitioning the one or more wireless devices from SU-MIMO pairing to MU-MIMO pairing based on the determining that the one or more wireless devices belongs to the one or more groups, the determining that the signal quality metric is below the first threshold, and the determining that the second signal quality metric is below the third threshold. Similarly, the one or more wireless devices may be transitioned from MU-MIMO pairing to SU-MIMO pairing based on determining that the one or more wireless devices belongs to the one or more groups, the determining that the signal quality metric is at or above the first threshold, and the determining that the second signal quality metric is at or above the third threshold.

The method may further include, transitioning the one or more wireless devices from SU-MIMO pairing to MU-MIMO pairing based on the determining that the one or more wireless devices belongs to the one or more groups and the determining that the signal quality metric has dropped by a fourth threshold amount. For example, even if the signal quality metric has not dropped low enough to reach the first threshold, if it drops by a specific amount, 50% for example, the transition may be triggered. Likewise, the transition may be triggered if the signal quality metric drops by a specific rate, 50% over a period of 1 minute, for example. This specific amounts, rates and times may be set to any useful amounts, rate or times and are not restricted by the examples given here. Similarly, the one or more wireless devices may be transitioned from MU-MIMO pairing to SU-MIMO pairing based on the determining that the one or more wireless devices belongs to the one or more groups and the determining that the signal quality metric has increased by a fourth threshold amount.

Access node 110 can comprise a processor and associated circuitry to execute or direct the execution of computer-readable instructions to perform operations such as those further described herein. Briefly, access node 110 can retrieve and execute software from storage, which can include a disk drive, a flash drive, memory circuitry, or some other memory device, and which can be local or remotely accessible. The software comprises computer programs, firmware, or some other form of machine-readable instructions, and may include an operating system, utilities, drivers, network interfaces, applications, or some other type of software, including combinations thereof. Further, access node 110 can receive instructions and other input at a user interface. Access node 110 communicates with gateway node 102 and controller node 104 via communication link 106. Access node 110 may communicate with other access nodes (not shown) using a direct link such as an X2 link or similar.

Wireless devices 150-153 may be any device, system, combination of devices, or other such communication platform capable of communicating wirelessly with access node 110 using one or more frequency bands deployed therefrom. Each of wireless devices 150-153 may be, for example, a mobile phone, a wireless phone, a wireless modem, a personal digital assistant (PDA), a voice over internet protocol (VOIP) phone, a voice over packet (VOP) phone, or a soft phone, as well as other types of devices or systems that can exchange audio or data via access node 110. Other types of communication platforms are possible.

Communication network 101 can be a wired and/or wireless communication network, and can comprise processing nodes, routers, gateways, and physical and/or wireless data links for carrying data among various network elements, including combinations thereof, and can include a local area network a wide area network, and an internetwork (including the Internet). Communication network 101 can be capable of carrying data, for example, to support voice, push-to-talk, broadcast video, and data communications by wireless devices 150-153, etc. Wireless network protocols can comprise MBMS, code division multiple access (CDMA) 1×RTT, Global System for Mobile communications (GSM), Universal Mobile Telecommunications System (UMTS), High-Speed Packet Access (HSPA), Evolution Data Optimized (EV-DO), EV-DO rev. A, Third Generation Partnership Project Long Term Evolution (3GPP LTE), and Worldwide Interoperability for Microwave Access (WiMAX), Fourth Generation broadband cellular (4G, LTE Advanced, etc.), and Fifth Generation mobile networks or wireless systems (5G, 5G New Radio ("5G NR"), or 5G LTE). Wired network protocols that may be utilized by communication network 101 comprise Ethernet, Fast Ethernet, Gigabit Ethernet, Local Talk (such as Carrier Sense Multiple Access with Collision Avoidance), Token Ring, Fiber Distributed Data Interface (FDDI), and Asynchronous Transfer Mode (ATM). Communication network 101 can also comprise additional base stations, controller nodes, telephony switches, internet routers, network gateways, computer systems, communication links, or some other type of communication equipment, and combinations thereof.

Communication link 106 can use various communication media, such as air, space, metal, optical fiber, or some other signal propagation path—including combinations thereof. Communication link 106 can be wired or wireless and use various communication protocols such as Internet, Internet protocol (IP), local-area network (LAN), optical networking, hybrid fiber coax (HFC), telephony, T1, or some other communication format—including combinations, improvements, or variations thereof. Wireless communication links can be a radio frequency, microwave, infrared, or other similar signal, and can use a suitable communication protocol, for example, Global System for Mobile telecommunications (GSM), Code Division Multiple Access (CDMA), Worldwide Interoperability for Microwave Access (WiMAX), Long Term Evolution (LTE), 5G NR, or combinations thereof. Communications link 106 may include S1 communications links. Other wireless protocols can also be used. Communication link 106 can be a direct link or might include various equipment, intermediate components, systems, and networks. Communication link 106 may comprise many different signals sharing the same link.

Gateway node 102 can be any network node configured to interface with other network nodes using various protocols. Gateway node 102 can communicate user data over system 100. Gateway node 102 can be a standalone computing device, computing system, or network component, and can be accessible, for example, by a wired or wireless connection, or through an indirect connection such as through a computer network or communication network. For example, gateway node 102 can include a serving gateway (SGW) and/or a public data network gateway (PGW), a user plane function (UPF), etc. One of ordinary skill in the art would recognize that gateway node 102 is not limited to any specific technology architecture, such as Long Term Evolution (LTE) or 5G NR, and can be used with any network architecture and/or protocol.

Gateway node 102 can comprise a processor and associated circuitry to execute or direct the execution of computer-readable instructions to obtain information. Gateway node 102 can retrieve and execute software from storage, which can include a disk drive, a flash drive, memory circuitry, or some other memory device, and which can be local or remotely accessible. The software comprises computer programs, firmware, or some other form of machine-readable instructions, and may include an operating system, utilities, drivers, network interfaces, applications, or some other type of software, including combinations thereof. Gateway node 102 can receive instructions and other input at a user interface.

Controller node 104 can be any network node configured to communicate information and/or control information over system 100. Controller node 104 can be configured to transmit control information associated with a handover procedure. Controller node 104 can be a standalone computing device, computing system, or network component, and can be accessible, for example, by a wired or wireless connection, or through an indirect connection such as through a computer network or communication network. For example, controller node 104 can include a mobility management entity (MME), a session management function (SMF), a Home Subscriber Server (HSS), a Policy Control and Charging Rules Function (PCRF), an authentication, authorization, and accounting (AAA) node, a rights management server (RMS), a subscriber provisioning server (SPS), a policy server, etc. One of ordinary skill in the art would recognize that controller node 104 is not limited to any specific technology architecture, such as Long Term Evolution (LTE) or 5G NR, and can be used with any network architecture and/or protocol.

Controller node 104 can comprise a processor and associated circuitry to execute or direct the execution of computer-readable instructions to obtain information. Controller node 104 can retrieve and execute software from storage, which can include a disk drive, a flash drive, memory circuitry, or some other memory device, and which can be local or remotely accessible. In an exemplary embodiment, controller node 104 includes a database 105 for storing correlations of transmission types with antenna configurations, and so on. This information may be requested by or shared with access node 110 via communication link 106, X2 connections, and so on. The software comprises computer programs, firmware, or some other form of machine-readable instructions, and may include an operating system, utilities, drivers, network interfaces, applications, or some other type of software, and combinations thereof. Controller node 104 can receive instructions and other input at a user interface.

Other network elements may be present in system 100 to facilitate communication but are omitted for clarity, such as base stations, base station controllers, mobile switching centers, dispatch application processors, and location registers such as a home location register or visitor location register. Furthermore, other network elements that are omitted for clarity may be present to facilitate communication, such as additional processing nodes, routers, gateways, and physical and/or wireless data links for carrying data among the various network elements, e.g. between access node 110 and communication network 101.

Further, the methods, systems, devices, networks, access nodes, and equipment described above may be implemented with, contain, or be executed by one or more computer systems and/or processing nodes. The methods described above may also be stored on a non-transitory computer readable medium. Many of the elements of communication system 100 may be, comprise, or include computers systems and/or processing nodes. This includes, but is not limited to: access node 110, controller node 104, and/or network 101.

Figure 2:
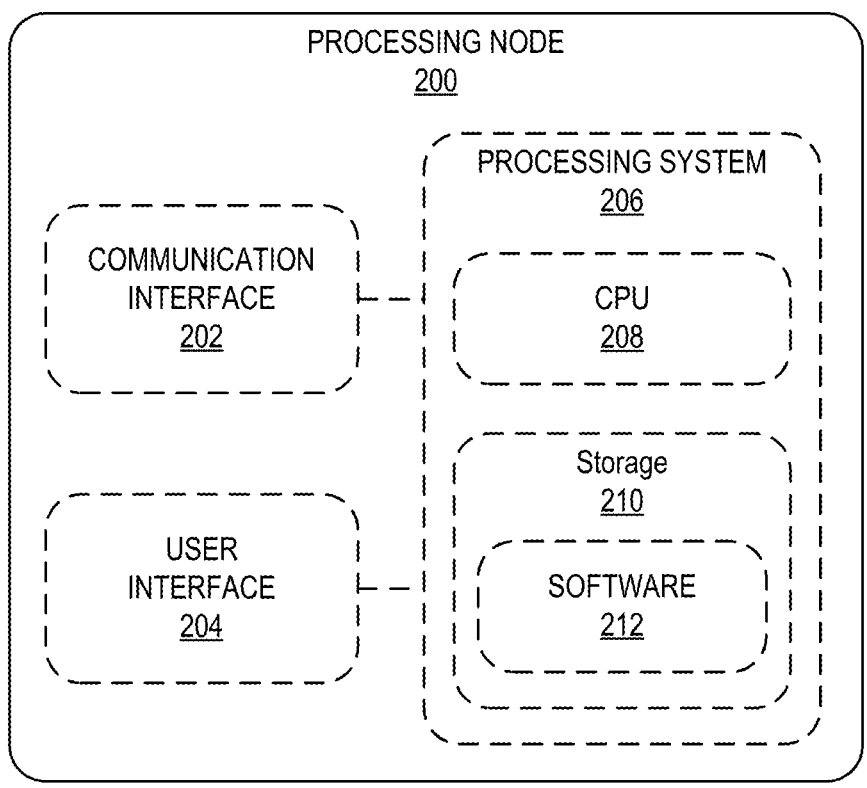
FIG. 2 illustrates an exemplary processing node in accordance with various aspects of the present disclosure.

FIG. 2 depicts an exemplary processing node 200 for managing MIMO wireless device pairing. The processing node 200 includes a communication interface 202, user interface 204, and processing system 206 in communication with communication interface 202 and user interface 204. Processing system 206 includes a processor 208, storage 210, which can comprise a disk drive, flash drive, memory circuitry, or other memory device including, for example, a buffer. Storage 210 can store software 212 which is used in the operation of the processing node 200. Software 212 may include computer programs, firmware, or some other form of machine-readable instructions, including an operating system, utilities, drivers, network interfaces, applications, or some other type of software. Processing system 206 may include a microprocessor 208 and other circuitry to retrieve and execute software 212 from storage 210. Processing node 200 may further include other components such as a power management unit, a control interface unit, etc., which are omitted for clarity. Communication interface 202 permits processing node 200 to communicate with other network elements. User interface 204 permits the configuration and control of the operation of processing node 200.

In an exemplary embodiment, software 212 can include instructions for monitoring a signal quality between an access node and one or more wireless devices, determining that a signal quality metric is below a first threshold based on the monitoring of the signal quality between the access node and the one or more wireless devices, determining that the one or more devices belongs to one or more groups based at least in part on a required QoS of the one or more wireless devices, and transitioning the one or more wireless devices from SU-MIMO pairing to MU-MIMO pairing based on the determining that the one or more wireless devices belongs to the one or more groups and the determining that the signal quality metric is below the first threshold.

The signal quality metric may be spectral efficiency, packet time delay, and packet error or any similar metric useful for monitoring signal quality. With these signal quality metrics, a lower metric indicates a higher signal quality. The groups required QoS may be determined by the type of service being provided to the one or more wireless devices or by a subscription level of an owner of the one or more wireless devices.

The instructions may further include, determining that the signal quality metric rises to be at or above a second threshold, and transitioning the one or more wireless devices from MU-MIMO pairing to SU-MIMO pairing based on the determining that the one or more wireless devices belongs to the one or more groups and the determining that the signal quality metric has risen to be at or above the second threshold.

The instructions may further include, determining that a second signal quality metric is below a third threshold based on the monitoring of the signal quality between the access node and the one or more wireless devices, and transitioning the one or more wireless devices from SU-MIMO pairing to MU-MIMO pairing based on the determining that the one or more wireless devices belongs to the one or more groups, the determining that the signal quality metric is below the threshold, and the determining that the second signal quality metric is below the third threshold.

The instructions may further include, transitioning the one or more wireless devices from SU-MIMO pairing to MU-MIMO pairing based on the determining that the one or more wireless devices belongs to the one or more groups and the determining that the signal quality metric has dropped by a fourth threshold amount. For example, even if the signal quality metric has not dropped low enough to reach the first threshold, if it drops by a specific amount, 50% for example, the transition may be triggered. Likewise, the transition may be triggered if the signal quality metric drops by a specific rate, 50% over a period of 1 minute, for example. This specific amounts, rates and times may be set to any useaful amounts, rate or times and are not restricted by the examples given here.

FIG. 3 depicts an exemplary access node 310 for providing wireless service in wireless networks. Access node 310 is configured as an access point for providing network services from network 301 to end-user wireless devices such as wireless devices 150-153 in FIG. 1. Access node 310 is illustrated as comprising a processor 311, a memory 312 for storing logical modules that perform operations described herein, and one or more transceivers 313 for transmitting and receiving signals via antennae 314. Combination of antennae 314 and transceivers 313 are configured to deploy one or more radio air interfaces using different RATs, frequencies, and/or operating modes. Additional transceivers and antennae may be incorporated in order to deploy 4G, 5G, mm-wave, SU-MIMO, MU-MIMO or massive MU-MIMO data streams to wireless devices attached to access node 310, as well as to facilitate communication with other network nodes on network 301. Further, access node 310 is communicatively coupled to network 301 via communication interface 306, which may be any wired or wireless link as described above. The one or more antennae 314 can include any combination of: antennae associated with different radio access technologies (RATs) (including 3G, 4G, 5G, 5G sub 6G, 5G millimeter wave), antennae associated with different arrays (including 2×2, 4×2, 4×4, 8×8, 16×16, 32×32, 64×64, 128×128, and so on), and beamforming antennae.

In an exemplary embodiment, memory 312 can include instructions for monitoring a signal quality between an access node and one or more wireless devices, determining that a signal quality metric is below a first threshold based on the monitoring of the signal quality between the access node and the one or more wireless devices, determining that the one or more devices belongs to one or more groups based at least in part on a required QoS of the one or more wireless devices, and transitioning the one or more wireless devices from SU-MIMO pairing to MU-MIMO pairing based on the determining that the one or more wireless devices belongs to the one or more groups and the determining that the signal quality metric is below the first threshold.

As discussed, the signal quality metric may include spectral efficiency, packet time delay, and packet error. With these signal quality metrics, a lower metric indicates a higher signal quality. The groups required QoS may be determined by the type of service being provided to the one or more wireless devices or by a subscription level of an owner of the one or more wireless devices.

The instructions may further include, determining that the signal quality metric rises to be at or above a second threshold, and transitioning the one or more wireless devices from MU-MIMO pairing to SU-MIMO pairing based on the determining that the one or more wireless devices belongs to the one or more groups and the determining that the signal quality metric has risen to be at or above the second threshold.

The instructions may further include, determining that a second signal quality metric is below a third threshold based on the monitoring of the signal quality between the access node and the one or more wireless devices, and transitioning the one or more wireless devices from SU-MIMO pairing to MU-MIMO pairing based on the determining that the one or more wireless devices belongs to the one or more groups, the determining that the signal quality metric is below the first threshold, and the determining that the second signal quality metric is below the third threshold.

The instructions may further include, transitioning the one or more wireless devices from single-user multiple input multiple output (SU-MIMO) pairing to multi-user MIMO (MU-MIMO) pairing based on the determining that the one or more wireless devices belongs to the one or more groups and the determining that the signal quality metric has dropped by a fourth threshold amount. For example, even if the signal quality metric has not dropped low enough to reach the first threshold, if it drops by a specific amount, 50% for example, the transition may be triggered. Likewise, the transition may be triggered if the signal quality metric drops by a specific rate, 50% over a period of 1 minute, for example. This specific amounts, rates and times may be set to any useful amounts, rates or times and are not restricted by the examples given here.

FIG. 4 illustrates an exemplary method 400 for managing wireless devices in a wireless network. Method 400 may be performed by any suitable combination of processors, for example a processor contained in an access node such as access node 110, 310. In other embodiments, the method can be implemented with any suitable network element, such as processing node 200. Although FIG. 4 depicts steps performed in a particular order for purposes of illustration and discussion, the operations discussed herein are not limited to any particular order or arrangement. One skilled in the art, using the disclosures provided herein, will appreciate that various steps of the methods can be omitted, rearranged, combined, and/or adapted in various ways.

Method 400 begins in step 410 where a signal quality between an access node and one or more wireless devices is monitored. In step 420, it is determined that a signal quality metric is below a first threshold based on the monitoring of the signal quality. The signal quality metric may, for example, be one of spectral efficiency, packet time delay, and packet error rate. With these signal quality metrics, a lower metric indicates a higher signal quality. In step 430, it is determined that the one or more wireless devices belongs to one or more groups based at least in part on a required QoS of the one or more wireless devices. The groups required QoS may be determined by a type of service being provided to the wireless device or a subscription level of an owner of the wireless device. In step 440, the one or more wireless devices are transitioned from SU-MIMO to MU-MIMO based on determining that the one or more wireless devices belongs to one or more groups and determining that the signal quality metric is below the first threshold.

Method 400 may include optional steps of determining that the signal quality metric rises to be at or above a second threshold and transitioning the one or more wireless device from MU-MIMO pairing to SU-MIMO pairing based on determining that the one or more wireless devices belongs to the one or more groups and determining that the signal quality metric has risen to be at or above the second threshold.

Method 400 may include optional steps of determining that a second signal metric is below a third threshold based on the monitoring of the signal quality between the access node and the one or more wireless devices, and transitioning the one or more wireless devices from SU-MIMO pairing to MU-MIMO pairing based on determining that the one or more wireless devices belongs to the one or more groups, determining that the signal quality metric is below the first threshold, and determining that the second signal quality metric is below the third threshold.

Method 400 may include the optional step of transitioning the one or more wireless devices from SU-MIMO pairing to MU-MIMO pairing based on determining that the one or more wireless devices belongs to the one or more groups and determining that the signal quality metric has dropped by a fourth threshold amount. For example, even if the signal quality metric has not dropped low enough to reach the first threshold, if it drops by a specific amount, 50% for example, the transition may be triggered. Likewise, the transition may be triggered if the signal quality metric drops by a specific rate, 50% over a period of 1 minute, for example. This specific amounts, rates and times may be set to any useful amounts, rates or times and are not restricted by the examples given here.

FIG. 5 illustrates an exemplary method 500 for managing wireless devices in a wireless network. Method 500 may be performed by any suitable combination of processors, for example a processor contained in an access node such as access node 110, 310. In other embodiments, the method can be implemented with any suitable network element, such as processing node 200. Although FIG. 5 depicts steps performed in a particular order for purposes of illustration and discussion, the operations discussed herein are not limited to any particular order or arrangement. One skilled in the art, using the disclosures provided herein, will appreciate that various steps of the methods can be omitted, rearranged, combined, and/or adapted in various ways.

Method 500 begins in step 510 where a signal quality between an access node and one or more wireless devices is monitored. The signal quality may be monitored by monitoring one or more of spectral efficiency, packet time delay, and packet error rate or any other relevant indicator of signal quality. In step 520, it is determined that the one or more wireless devices belongs to one or more groups based at least in part on a required Quality of Service (QoS) of the one or more wireless devices. The required QoS may be determined, for example, by the type of service being provided to the one or more wireless devices or by a subscription level of an owner of the one or more wireless devices. In step 530, a first threshold is determined based on the one or more groups to which the one or more wireless devices belongs. In step 540, the one or more wireless devices are paired for SU-MIMO if the signal quality falls below the first threshold. In step 550, the one or more wireless devices are paired for MU-MIMO if the signal quality is at or above the first threshold.

Method 500 may include the optional step of transitioning the one or more wireless devices from MU-MIMO pairing to SU-MIMO pairing based on determining that the one or more wireless devices belongs to one or more groups and determining that the signal quality has dropped by a third threshold amount. For example, even if the signal quality has not dropped low enough to reach the first threshold, if it drops by a specific amount, 50% for example, the transition may be triggered. This specific amount may be set to any useful amount and is not restricted by the example given here.

Method 500 may include the optional step of transitioning the one or more wireless devices from MU-MIMO pairing to SU-MIMO pairing based on determining that the one or more wireless devices belongs to one or more groups and determining that the signal quality has dropped at a rate exceeding a fourth threshold. For example, even if the signal quality has not dropped low enough to reach the first threshold, if the signal quality drops by a specific rate, 50% over a period of 1 minute, for example, the transition may be triggered. This specific amounts, rates and times may be set to any useful amounts, rate or times and are not restricted by the examples given here.

In some embodiments, methods 400 and 500 may include additional steps or operations. Furthermore, the methods may include steps shown in each of the other methods. As one of ordinary skill in the art would understand, the methods of 400 and 500 may be integrated in any useful manner and the steps may be performed in any useful sequence.

The exemplary systems and methods described herein can be performed under the control of a processing system executing computer-readable codes embodied on a computer-readable recording medium or communication signals transmitted through a transitory medium. The computer-readable recording medium is any data storage device that can store data readable by a processing system, and includes both volatile and nonvolatile media, removable and non-removable media, and contemplates media readable by a database, a computer, and various other network devices.

Examples of the computer-readable recording medium include, but are not limited to, read-only memory (ROM), random-access memory (RAM), erasable electrically programmable ROM (EEPROM), flash memory or other memory technology, holographic media or other optical disc storage, magnetic storage including magnetic tape and magnetic disk, and solid state storage devices. The computer-readable recording medium can also be distributed over network-coupled computer systems so that the computer-readable code is stored and executed in a distributed fashion. The communication signals transmitted through a transitory medium may include, for example, modulated signals transmitted through wired or wireless transmission paths.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. As a result, the invention is not limited to the specific embodiments described above, but only by the following claims and their equivalents.

What is claimed is:

1. A method of managing wireless devices in a wireless network, the method comprising:

monitoring a signal quality between an access node and one or more wireless devices;

determining that a signal quality metric is below a first threshold based on the monitoring of the signal quality between the access node and the one or more wireless devices;

determining that the one or more wireless devices belongs to one or more groups based at least in part on a required Quality of Service (QoS) of the one or more wireless devices; and transitioning the one or more wireless devices from single-user multiple input multiple output (SU-MIMO) pairing to multi-user MIMO (MU-MIMO) pairing based on the determining that the one or more wireless devices belongs to the one or more groups and the determining that the signal quality metric is below the first threshold.

2. The method of claim 1, wherein the signal quality metric is one of spectral efficiency, packet time delay, and packet error rate.

3. The method of claim 1, further comprising:

determining that the signal quality metric rises to be at or above a second threshold; and transitioning the one or more wireless devices from MU-MIMO pairing to SU-MIMO pairing based on the determining that the one or more wireless devices belongs to the one or more groups and the determining that the signal quality metric has risen to be at or above the second threshold.

4. The method of claim 1, wherein the required QoS of the one or more groups' one or more wireless devices is determined by a type of service being provided to the one or more wireless devices.

5. The method of claim 1, wherein the required QoS of the one or more groups' one or more wireless devices is determined by a subscription level of an owner of the one or more wireless devices.

6. The method of claim 1, the method further comprising:

determining that a second signal quality metric is below a third threshold based on the monitoring of the signal quality between the access node and the one or more wireless devices; and transitioning the one or more wireless devices from SU-MIMO pairing to MU-MIMO pairing based on the determining that the one or more wireless devices belongs to the one or more groups, the determining that the signal quality metric is below the first threshold, and the determining that the second signal quality metric is below the third threshold.

7. The method of claim 1, further comprising:

transitioning the one or more wireless devices from SU-MIMO pairing to MU-MIMO pairing based on the determining that the one or more wireless devices belongs to the one or more groups and the determining that the signal quality metric has dropped by a fourth threshold amount.

8. A system comprising:

an access node including at least one electronic processor configured to perform operations including:

monitoring a signal quality between the access node and one or more wireless devices;

determining that a signal quality metric is below a first threshold based on the monitoring of the signal quality between the access node and the one or more wireless devices;

determining that the one or more wireless devices belongs to one or more groups based at least in part on a required Quality of Service (QoS) of the one or more wireless devices; and transitioning the one or more wireless devices from single-user multiple input multiple output (SU-MIMO) pairing to multi-user MIMO (MU-MIMO) pairing based on the determining that the one or more wireless devices belongs to the one or more groups and the determining that the signal quality metric is below the first threshold.

9. The system of claim 8, wherein the signal quality metric is one of spectral efficiency, packet time delay, and packet error rate.

10. The system of claim 8, further comprising:

determining that the signal quality metric rises to be at or above a second threshold; and transitioning the one or more wireless devices from MU-MIMO pairing to SU-MIMO pairing based on the determining that the one or more wireless devices belongs to the one or more groups and the determining that the signal quality metric has risen to be at or above the second threshold.

11. The system of claim 8, wherein the required QoS of the one or more groups' one or more wireless devices is determined by a type of service being provided to the one or more wireless devices.

12. The system of claim 8, wherein the required QoS of the one or more groups' one or more wireless devices is determined by a subscription level of an owner of the one or more wireless devices.

13. The system of claim 8, further comprising:

determining that a second signal quality metric is below a second threshold based on the monitoring of the signal quality between the access node and the one or more wireless devices; and transitioning the one or more wireless devices from SU-MIMO pairing to MU-MIMO pairing based on the determining that the one or more wireless devices belongs to the one or more groups, the determining that the signal quality metric is below the first threshold, and the determining that the second signal quality metric is below the second threshold.

14. The system of claim 8, further comprising:

transitioning the one or more wireless devices from SU-MIMO pairing to MU-MIMO pairing based on the determining that the one or more wireless devices belongs to the one or more groups and the determining that the signal quality metric has dropped by a third threshold amount.

15. A method of managing wireless devices in a wireless network, the method comprising:

monitoring a signal quality between an access node and one or more wireless devices;

determining that the one or more wireless devices belongs to one or more groups based at least in part on a required Quality of Service (QoS) of the one or more wireless devices;

determining a first threshold based on the one or more groups to which the one or more wireless devices belongs;

pairing the one or more wireless devices for single-user multiple input multiple output (SU-MIMO) if the signal quality falls below the first threshold; and pairing the one or more wireless devices for multi-user multiple input multiple output (MU-MIMO) if the signal quality is at or above the first threshold.

16. The method of claim 15, wherein the signal quality is determined by monitoring one or more of spectral efficiency, packet time delay, and packet error rate.

17. The method of claim 15, further comprising:

transitioning the one or more wireless devices from MU-MIMO pairing to SU-MIMO pairing based on the determining that the one or more wireless devices belongs to the one or more groups and the determining that the signal quality has dropped by a third threshold amount.

18. The method of claim 15, further comprising:

transitioning the one or more wireless devices from MU-MIMO pairing to SU-MIMO pairing based on the determining that the one or more wireless devices belongs to the one or more groups and the determining that the signal quality has dropped at a rate exceeding a fourth threshold.

19. The method of claim 15, wherein the required QoS of the one or more groups' one or more wireless devices is determined by a type of service being provided to the one or more wireless devices.

20. The method of claim 15, wherein the required QoS of the one or more groups' one or more wireless devices is determined by a subscription level of an owner of the one or more wireless devices.

* * * * *